April 22, 1969 H. I. SWANSON 3,440,566

PULSE DURATION MODULATOR HAVING TRIGGER CIRCUIT UTILIZING A MODIFIED TRIANGULAR WAVEFORM

Filed Feb. 10, 1966

INVENTOR.
Hilmer I. Swanson

BY Hill, Sherman, Meroni, Gross & Simpson ATTORNEYS

United States Patent Office 3,440,566

Patented Apr. 22, 1969

3,440,566

PULSE DURATION MODULATOR HAVING TRIGGER CIRCUIT UTILIZING A MODIFIED TRIANGULAR WAVEFORM

Hilmer I. Swanson, Quincy, Ill., assignor to Gates Radio Company, Quincy, Ill., a corporation of Illinois Filed Feb. 10, 1966, Ser. No. 526,444

Int. Cl. H03k 7/08

U.S. Cl. 332—9 10 Claims

ABSTRACT OF THE DISCLOSURE

A pulse duration modulator having a trigger circuit for developing a substantially triangular waveform and having switching means for pulse modulating an audio signal in accordance with the comparative magnitudes of the audio and trigger signals. The pulse duration modulator has means for modifying the substantially triangular trigger signal in the form of a pair of parallel diodes connected to have opposite polarities and which diodes develop a square wave having the same frequency as the triangular trigger signal. The square wave is superimposed on the triangular trigger signal for developing a substantially spiked configuration at peaks of the triangular waveform.

This invention relates to a pulse duration modulation system and in particular to a pulse duration modulator having means modifying the pulse trigger signal for increasing the modulation efficiency of the system.

Pulse duration modulation systems generally employ a trigger signal which may be compared with an information signal for converting the information content into a series of modulation pulses having pulse widths which reflect the amplitude of the information signal. Various types of trigger signals may be employed for being compared with the information signal and for initiating the modulation pulse response.

A typical trigger signal used in pulse modulation systems is the triangular waveform which has the advantage of having a relatively high modulation efficiency. Generally, this is due to the fact that the triangular waveform has well defined peaks which may be compared readily with the instantaneous value of an information signal. For instance, when the peak of a triangular trigger signal exceeds the information signal, the modulation circuit may be triggered into an ON state for a shorter interval than could be expected from other waveforms. Essentially, a shorter sampling time may be utilized with the triangular waveform as a trigger signal.

However, while the triangular waveform has well defined peaks for triggering the modulation circuit into an ON and OFF state within a relatively short time interval, the modulation circuit itself may have inherent delayed responses which prevent a high efficiency modulation as might be expected by the theoretical application of the triangular waveform. For instance, in solid state trigger circuits, hysteresis of transistors or the like may prevent the circuit from switching from an ON to an OFF state at the specified cutoff voltage level. The circuit hysteresis may therefore cause a time delay after the cutoff voltage is applied and before the cutoff is actually achieved.

Since pulse width modulation develops a series of pulses which have varying widths to reflect the amplitude of the information signal, it is important that the proper relationship between pulse widths be achieved if the recovered or demodulated information signal is to be accurate. This means, for instance, that if larger width pulses are developed to represent higher information signals, then proportionately smaller pulses must be developed to represent proportionately smaller information signals. However, delay in the operation of the trigger circuit places a limitation on the smallest width pulse obtainable in that a finite pulse width is generated by the time delay itself, which adds to the nominal pulse width expected from a theoretical comparison of the trigger and information signals.

The increase in pulse width due to the delay in the functioning of the trigger circuit produces distortion in the recovered information signal in that the proper relationship between pulse sizes has been distorted. This is especially true for smaller width pulses where small changes in pulse width produce appreciable changes in the information content.

Accordingly, it is a principal object of this invention to provide a pulse duration modulator having an improved modulation efficiency.

It is also an object of this invention to provide a pulse duration modulator having means for modifying an input signal to compensate for delays inherent in the operation of a pulse trigger circuit.

It is another object of this invention to provide a pulse duration modulator having means for modifying a triangular wave trigger signal wherein the modified signal compensates for inherent delays in the operation of the pulse trigger circuit.

It is an additional object of this invention to provide a solid state pulse duration modulator having a triangular input signal with a modified substantially infinite sloped portion at the peaks thereof to compensate for hysteresis in the operation of the solid state trigger circuit.

It is another object of this invention to provide a pulse modulation circuit having a repetitive square wave input signal, and integrating means for providing a substantially triangular trigger signal from the square wave input and a means for adding a low level square wave signal to the triangular trigger signal for improving the modulation efficiency of the circuit.

It is a further object of this invention to provide a pulse duration modulator circuit having means for developing a substantially triangular voltage wave at the input thereof and for developing a low level substantially square wave signal which lags the triangular signal by approximately 90° and which when added to the triangular signal develops a modified trigger signal for improving the modulation efficiency of the circuit.

It is also an object of this invention to provide a pulse duration modulator having a parallel diode combination wherein the diodes are connected at opposite polarities and the diode combination is serially connected to an integrating capacitor and wherein the series branch consisting of the capacitor and the parallel diode combination is connected across the circuit input terminals for developing a modified trigger signal from a square wave current input signal.

These and other objects, features and advantages of the present invention will be understood in greater detail from the following description and the associated drawing wherein reference numerals are utilized in designating an illustrative embodiment and wherein.

Figures 1, 2, 3, 4:
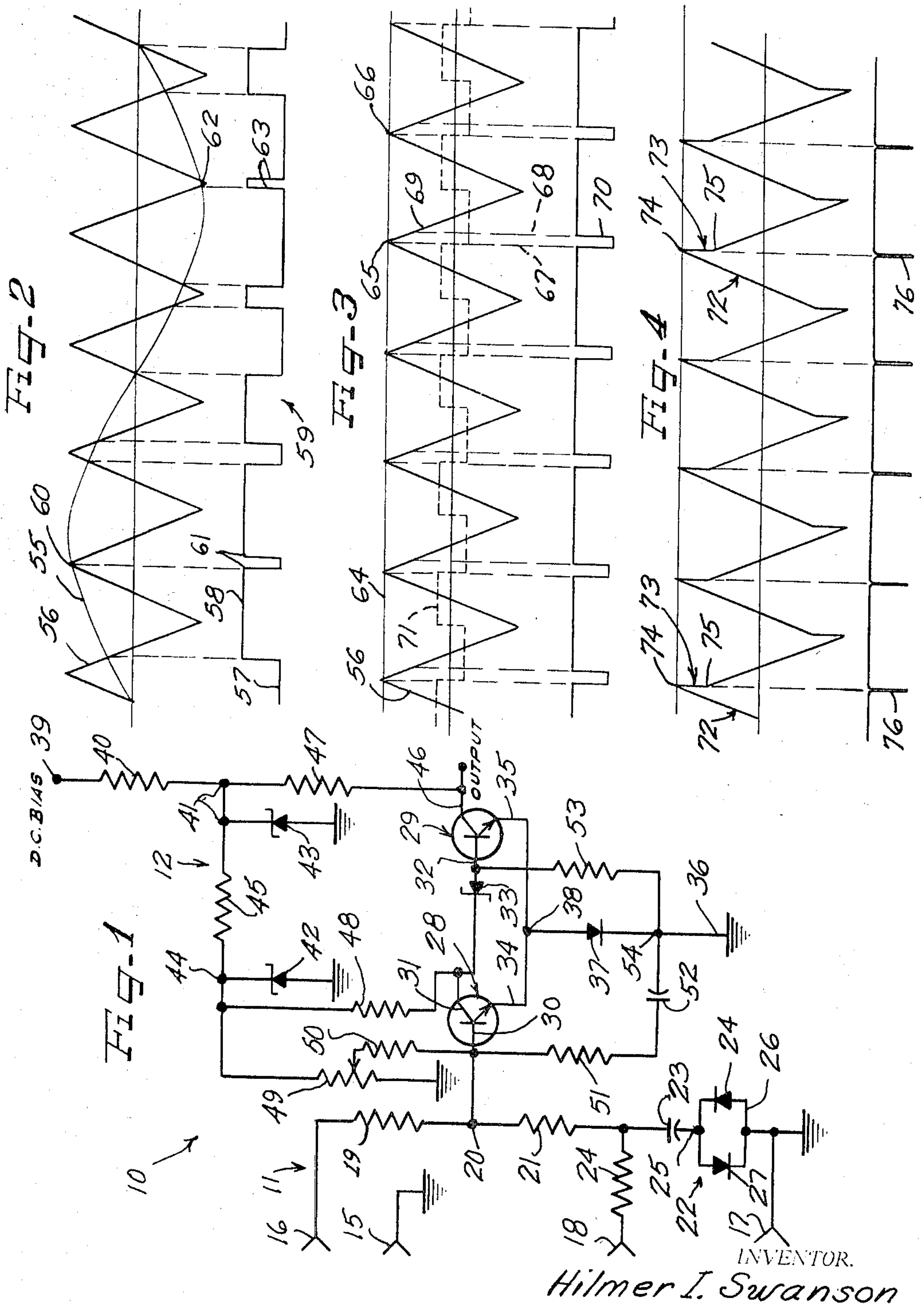
FIGURE 1 is a schematic illustration of a pulse duration modulator according to this invention.
FIGURE 2 is a diagrammatic view of a triangular trigger waveform as compared with an information signal and showing the resulting modulated pulse train.
FIGURE 3 is a diagrammatic view similar to the view of FIGURE 2 for more clearly illustrating the hysteresis characteristic of the pulse duration modulator circuit of FIGURE 1.
FIGURE 4 is a further diagrammatic view showing the combined trigger signals illustrated in FIGURE 3 in the form of a modified trigger input signal and illustrating the resulting improved pulse modulation response.

This invention concerns generally a means for modifying a trigger input signal for a pulse duration modulation circuit to compensate for the hysteresis delay of the triggering devices. Due to hysteresis in the triggering circuit a lower voltage level may be required to cut off the circuit operation than would be expected in the absence of hysteresis. Since a triangular trigger signal is used to sample the information signal, a lower voltage cutoff level means that a larger time interval must expire for a given information signal level before cutoff is achieved. That is, cutoff, due to hysteresis, occurs at a lower voltage and due to the triangular wave signal, at a later time.

The pulse modulator circuit is indicated generally by the reference numeral 10 and includes an input circuit 11 and a modulation circuit 12.

The input section 11 has two sets of input terminals 15–16 and 17–18. The audio signal is applied across the terminals 15 and 16 and is received through a resistor 19 at a junction point 20. A square wave voltage signal used ultimately for triggering the pulse modulator 12 is applied across the terminals 17 and 18 and is received in a modified form through a resistor 21 at the junction point 20.

The square wave signal applied at the terminals 17 and 18 is modified through a parallel diode circuit 22 and a series connected capacitor 23. The combination of the capacitor and the parallel diode circuit is connected directly across the input signal at the terminals 17 and 18 through a resistor 24.

The square wave current signal applied at the terminals 17 and 18 is integrated through the capacitor 23, resulting in a triangular voltage waveform. However, the presence of the parallel diode combination 22 alters the triangular waveform into a modified trigger signal.

The parallel diode combination 22 consists of diode 24 having an emitter terminal connected at the junction point 26 and a collector terminal connected at the junction point 25. The other diode 27 has its collector terminal connected at the junction point 26 and its emitter terminal connected at the junction point 25. The result is that the voltage developed between the terminals 25 and 26 of the parallel combination 22 is essentially a square wave voltage signal. The square wave signal is due to the approximately one-half volt drop which occurs across each of the diodes 24 and 27 during forward biasing conditions. When added to the triangular voltage wave as developed through the capacitor 23, a modified trigger voltage signal is achieved which when applied to the modulator circuit 12 increases the modulation efficiency.

The pulse modulation circuit 12 comprises first and second transistors 28 and 29. The transistor 28 has a base 30 connected directly to the junction point 20 and has a collector 31 connected to the base 32 of the transistor 29. A Zener diode 33 is serially connected between the collector 31 and the base 32 to provide a bias triggering level for the transistor 29. Also, the transistors 28 and 29 have emitters 34 and 35 respectively, connected to to ground as at the point 36 through a diode 37 connecting from a junction point 38.

The transistors 28 and 29 have their collectors maintained at a designated bias voltage level through a DC voltage supply applied at the terminal 39 through a resistor 40 to a junction point 41. The specific levels of biasing values applied to the respective collectors of the given transistors are determined by Zener diodes 42 and 43. The Zener diode 43 is connected from the junction point 41 to ground, and the diode 42 is connected to ground from the point 44 which is separated from the point 41 by a resistor 45. The junction point 41 is connected to the collector 46 of the transistor 29 through a resistor 47, while the junction point 44 is connected to the collector 31 of the transistor 28 through a resistor 48. The junction point 44 is further connected to the base 32 of the transistor 29 through a circuit branch comprising a variable resistor 49, series resistors 50 and 51, a capacitor 52 and a further resistor 53. A point 54 intermediate the capacitor 52 and the resistor 53 is grounded as at the point 36.

When both the transistors 28 and 29 are in an OFF condition, a given positive voltage level as determined by the diodes 42 and 43 is applied to the collectors 31 and 46 of the transistors 28 and 29, respectively.

Should the junction point 20 become positive, the transistor 28 will be placed in a conducting state and current will exist from the junction point 44 through the transistor 28 to ground at the point 36. The effect is that the collector 31 of the transistor 28 will be suddenly reduced in voltage due to the voltage drop across the resistor 48. Also, current will exist within the diode 33 resulting in an additional voltage drop from the collector 31 to the base 32 of the transistor 29. Accordingly, an ON condition for the transistor 28 results in an OFF condition for the transistor 29.

However, should the base 30 of the transistor 28 become sufficiently negative, the transistor 28 would be placed in an OFF condition which would greatly reduce the current within the transistor 28 and within the Zener diode 33, thereby significantly increasing the voltage at the base 32 of the transistor 29. This means that an OFF for the transistor 28 corresponds to an ON condition for the transistor 29.

For purposes of illustration, the audio input signal applied to the terminals 15 and 16 is shown in FIGURE 2 as a sinusoidal waveform 55. In practice, however, the input information signal may be a highly complex waveform as is well understood.

In FIGURE 2 a substantially triangular trigger signal 56 is compared to the audio signal 55 to illustrate the general features of the pulse modulation circuit of FIGURE 1. In particular, whenever the triangular signal 56 exceeds the information signal 55, the base 30 of the transistor 28 will be biased negatively for holding the transistor 28 in an off condition. With the transistor 28 biased into an off state, the transistor 29 is conducting and the voltage at the collector 46 is reduced to a minimum level due to the voltage drops across the resistors 40 and 47. The voltage level at the collector 46 at times when the waveform 56 exceeds the information signal 55 is shown in FIGURE 2 at the reference numeral 57.

However, when the information signal 55 exceeds the triangular trigger signal 56, the base 30 of the transistor 28 will be biased positively for placing the transistor 28 in a conducting state and for turning off the transistor 29. When the transistor 29 is in an OFF condition the voltage at the collector 46 rises to a level as at 58 in FIGURE 2.

Accordingly, the difference between the voltage levels of the trigger signal 56 and the information signal 55 is used as a means for turning the transistor modulation circuit alternately on and off to form the pulse train 59 of FIGURE 2. However, at time intervals during which the triangular pulse just exceeds the value of the information signal as at the point 60, a narrow pulse response is expected in order to correctly reflect the level of the information signal. This means that the pulse response of the trigger circuit must correctly reflect the time interval during which the triangular wave exceeds the information wave and vice versa.

Due to the hysteresis in the operation of the transistors 28 and 29, however, infinitely narrow pulse widths cannot be achieved as the delay in the circuit response due to the hysteresis results in a finite pulse width which in effect results in error in the recovered information signal. For instance, at the point 60 the triangular pulse 56 exceeds the information signal 55 for a brief time interval which is greatly exceeded by the pulse response indicated by the time interval 61 of the pulse train 59. Similarly the triangular wave 56 is exceeded by the information wave 55 at the point 62 during an equally brief time interval. However, the pulse response 63 is considerably wider than the expected response required to correctly reflect the level of the information signal.

The effect of circuit hysteresis is more clearly illustrated in FIGURE 3. In FIGURE 3 the triangular wave 56 is compared with a constant amplitude information signal 64. The waves 56 exceed the signal 64 at peaks 65 and 66 for brief time intervals as at the points 60 and 62 of FIGURE 2. Essentially the trigger circuit should turn on and off at the peaks of the triangular waveform 56. However, due to hysteresis, the circuit triggers on at the time interval 67, and does not trigger off until the time interval 68 corresponding to a lower voltage level 69 than the voltage at the point 65. The result is a pulse width as at 70 which does not correctly reflect the level of the information signal 64.

To compensate for the distortion produced by the hysteresis of the transistors 28 and 29, a substantially square waveform 71 is developed by the parallel diode combination 22 and is added to the voltage waveform 56. The combined trigger waveform as modified by the diode combination is shown in FIGURE 4 at 72.

It may be noted in FIGURE 3 that the square waveform 71 is 90° out of phase with the triangular waveform 56 which properly orientates the two signals for producing the modified wavefom 72. The phase shift as shown in FIGURE 3 is developed by the capacitor 23 as is well understood.

The combined waveform 72 has a substantially infinitely sloped portion 73 which extends from the trailing edge of the peak 74 to a lower level 75 determined by the height of the square wave signal 71.

Since the effect of the hysteresis associated with the circuit of FIGURE 1 is to cause the cutoff voltage as at 69 of FIGURE 3 to be lower than the cut-on voltage as at 65, the instantaneous change in voltage level of the trigger signal as provided by the infinitely sloped portion 73 of FIGURE 4 compensates for the delay otherwise required for the trigger signal to reach the lower cutoff voltage level. The error which was produced in FIGURE 3 was caused by the fact that the cutoff voltage occurred at a later time than was required to correctly modulate the information signal. In FIGURE 4, however, the sudden reduction in voltage level at the peaks of the trigger signal causes cutoff at the proper time for correctly modulating the information signal. Essentially, the circuit still cuts off at a lower voltage level than the cut-on level. However, the time at which the lower voltage level occurs has been adjusted to compensate for the circuit hysteresis and to provide a correct modulation of the information signal.

In FIGURE 4 the effect of the substantially infinitely sloped portion 73 of the modified trigger waveform 72 is shown in the form of abrupt changes in the pulse response as at 76 to correctly reflect the level of the information signal. For instance, had the modified trigger signal 72 been used in FIGURE 2 the pulse configurations indicated by the time intervals 61 and 63 would have been substantially narrower for increasing the modulation efficiency of the sampling points 60 and 62.

I claim as my invention:

1. A pulse duration modulator comprising:

a trigger circuit having input terminals for receiving an audio signal and a trigger input signal and having output terminals, switching means connected to a power source for varying the voltage level at said output terminals between a substantially constant maximum level and a substantially constant minimum level in accordance with the comparative magnitudes of the audio and trigger signals as applied to said input terminals, means applying a substantially triangular trigger signal to said input terminals, and means for modifying said trigger signal to have a spiked configuration at the peaks of said substantially triangular waveform.

2. A pulse duration modulator in accordance with claim 1 wherein said means for modifying said trigger signal comprises means for superimposing a substantial square wave signal on said substantially triangular waveform, whereby said trigger signal is provided with a substantially infinite sloped portion at the peaks thereof.

3. A pulse duration modulator in accordance with claim 1 wherein said means for modifying said trigger signal comprises:

a parallel diode combination serially connected with the triangular trigger signal input terminals, said parallel diode combination having first and second diodes connected in parallel relationship at opposing polarities, said parallel diode combination developing a square wave signal of substantially the frequency of the triangular trigger signal for causing a spiked configuration at the peaks of said substantially triangular waveform.

4. A pulse duration modulator in accordance with claim 3 wherein means are provided to phase the square wave signal for switching from a maximum to a minimum level at the positive peaks of the triangular trigger signal and from a minimum to a maximum level at the negative peaks of the triangular signal.

5. A pulse duration modulator comprising:

a trigger circuit having input terminals for receiving an audio signal and a trigger input signal and having an output terminal, said trigger input signal having a substantially triangular waveform, switching means for sensing an instantaneous difference in magnitudes of the audio and trigger signals and for cutting on and off in response thereto, means for applying a substantially square wave signal to the trigger input signal thereby to compensate for delay in cutoff time of said switching means.

6. A pulse duration modulator in accordance with claim 5 wherein an opposite polarity parallel diode combination and a capacitor are serially connected and wherein a substantial square wave input signal is applied across said series connected elements and wherein said elements are serially connected with one of said input terminals, wherein said capacitor integrates said square wave input signal for developing said substantially triangular trigger signal, said square wave input signal developing a square wave trigger signal across said diode combination, and said capacitor providing the necessary phase shift to cause said square wave trigger signal to swing from a maximum to a minimum at positive peaks of said substantially triangular trigger signal.

7. The method of pulse duration modulating an information signal comprising:

providing a substantially triangular trigger input signal, adding a relatively low level square wave signal to the triangular trigger signal, causing said square wave signal to switch from a maximum to a minimum level at positive peaks of said triangular trigger signal and to switch from a minimum to a maximum at negative peaks of the trigger signal, whereby the trailing edge of the modified triangular signal has a substantially infinitely sloped portion at the positive and negative peaks thereof, applying the modified trigger signal to a switching device, and causing said switching device to engage and disengage a power source according to whether the difference between said information signal and said trigger signal is positive or negative.

8. The method in accordance with claim 7 wherein engagement of said switching device is caused to disengage a second switching device for developing a maximum voltage output and wherein disengagement of said switching device is caused to engage the second switching device for developing a minimum voltage output.

9. A pulse duration modulator comprising:

a trigger circuit having a first set of input terminals for receiving an information signal and a second set of input terminals for receiving a trigger input signal, said trigger circuit including first and second swtching devices and means for connecting the same such that the turning on and off of one of said devices coincides with the turning off and on, respectively, of the other of said devices, means for connecting information and trigger input signals to the input of said first switching device and for engaging and disengaging a power source in accordance with the comparative magnitude of the information and trigger signals, said trigger signal being substantially triangular in waveshape, means for providing an infinitely sloped portion at the trailing edges of the positive and negative peaks of said trigger signal, and the height of said infinitely sloped portion being calculated to compensate for the voltage difference between switch on and switch off voltage values.

10. A pulse duration modulator in accordance with claim 9 wherein said last-named means generates and applies a substantially square wave signal to a substantially triangular signal such that the square wave switches from maximum to minimum levels at positive peaks of the triangular wave and from minimum to maximum levels at the negative peaks of the triangular wave.

References Cited

UNITED STATES PATENTS

| | | | |
|---|---|---|---|
| 2,975,367 | 3/1961 | Adams et al. | 328—36 X |
| 3,070,727 | 12/1962 | Birt | 307—228 X |
| 3,033,994 | 5/1962 | Fujimoto | 328—185 |
| 3,191,071 | 6/1965 | King et al. | 328—36 X |
| 3,277,319 | 10/1966 | Stevens | 307—263 X |
| 3,278,765 | 10/1966 | Mudie | 307—260 X |

ALFRED L. BRODY, *Primary Examiner.*

U.S. Cl. X.R.

307—228, 263, 265, 268; 328—36, 114, 185; 332—15